United States Patent
Hsiao et al.

(10) Patent No.: US 9,003,900 B2
(45) Date of Patent: Apr. 14, 2015

(54) CHAIN FORCE MEASURING DEVICE FOR MOUNTING ON A BICYCLE

(76) Inventors: Yun-Lung Hsiao, Taipei (TW); Hong-Jun Xu, Wuxi (CN)

(*) Notice: Subject to any disclaimer, the term of this patent is extended or adjusted under 35 U.S.C. 154(b) by 463 days.

(21) Appl. No.: 13/213,884

(22) Filed: Aug. 19, 2011

(65) Prior Publication Data
US 2012/0152033 A1    Jun. 21, 2012

(30) Foreign Application Priority Data
Dec. 15, 2010    (TW) ................ 99224319 U

(51) Int. Cl.
*G01L 1/12*      (2006.01)
*G01L 1/25*      (2006.01)
*G01L 5/10*      (2006.01)

(52) U.S. Cl.
CPC ...................... *G01L 5/102* (2013.01)

(58) Field of Classification Search
CPC ........... G01L 5/102; G01L 5/10; G01L 5/101; G01L 5/103; G01L 1/12; G01L 1/122; G01L 3/10; G01L 3/104; G01L 3/1435; G01L 5/0023
USPC ....................................................... 73/862.69
See application file for complete search history.

(56) References Cited

U.S. PATENT DOCUMENTS

| | | | | |
|---|---|---|---|---|
| 3,544,117 A * | 12/1970 | Bingham | ........................... | 279/6 |
| 4,537,022 A * | 8/1985 | Stahlecker | ..................... | 57/401 |
| 5,681,234 A * | 10/1997 | Ethington | ....................... | 474/70 |
| 5,788,007 A * | 8/1998 | Miekka | ..................... | 180/205.1 |
| 6,047,230 A * | 4/2000 | Spencer et al. | ................ | 701/57 |
| 6,418,797 B1 * | 7/2002 | Ambrosina et al. | ........ | 73/862.29 |
| 7,047,817 B2 * | 5/2006 | Lanham | .......................... | 73/773 |
| 7,814,800 B2 * | 10/2010 | Roovers et al. | ................. | 73/828 |
| 2007/0099735 A1 * | 5/2007 | Roovers et al. | ............... | 474/101 |
| 2007/0246318 A1 * | 10/2007 | Shirataki et al. | ................ | 192/45 |
| 2009/0114040 A1 * | 5/2009 | Mizuno | ....................... | 73/862.69 |
| 2009/0120211 A1 * | 5/2009 | Roovers et al. | .......... | 73/862.474 |
| 2009/0311112 A1 * | 12/2009 | Isono | ............................ | 417/233 |
| 2010/0113200 A1 * | 5/2010 | Yamamoto | .................... | 474/133 |
| 2010/0127807 A1 * | 5/2010 | Hammond | .................... | 335/255 |

\* cited by examiner

*Primary Examiner* — Lisa Caputo
*Assistant Examiner* — Philip Cotey
(74) *Attorney, Agent, or Firm* — Vedder Price, P.C.

(57) ABSTRACT

A chain force measuring device for measuring a chain force of a bicycle includes a dropout body unit having frame and axle connecting portions which are respectively connected to a frame fork and a wheel axle to define an accommodation space therebetween, and a hall sensing unit having a sensor extending from the frame connecting portion to spacedly confront a magnetic element which is disposed on a slidable carrier. By shifting of the magnetic element with the carrier due to the chain force exerted on the wheel axle, a magnetic field generated thereby is changed so as to give off a signal indicative of the magnitude of the chain force.

10 Claims, 7 Drawing Sheets

CHAIN FORCE MEASURING DEVICE FOR MOUNTING ON A BICYCLE

CROSS-REFERENCE TO RELATED APPLICATION

This application claims priority of Taiwanese Utility Model Application No. 099224319, filed on Dec. 15, 2010, the disclosure of which is herein incorporated by reference.

BACKGROUND OF THE INVENTION

1. Field of the Invention

This invention relates to a measuring device, more particularly to a chain force measuring device adapted for mounting on a bicycle.

2. Description of the Related Art

A conventional chain force measuring device is generally used to measure a force or torque exerted by a cyclist so as to control a driving force supplied by an electric drive motor of an electrically supported bicycle. As described in international patent applications WO 01/30643 and WO 03/073057, a force measuring device has strain gauges to detect a bending of a rear axle of a bicycle when a cyclist is pedaling to obtain a measurement signal of a chain force. A controller of the bicycle receives the measurement signal of the chain force to drive an electric drive motor of the bicycle so as to provide a proportional driving force. Therefore, the cyclist needs not to apply too much force on pedals.

Referring to FIG. 1, U.S. Pat. No. 7,814,800 B2 discloses another chain force measuring device which utilizes a hall sensing unit to measure the chain force and which is mounted on a dropout member 90 of an electrically supported bicycle. The hall sensing unit includes a hall sensor 95 and a magnetic element 94. The dropout member 90 includes a frame connecting part 91, an axle connecting part 92, and a rigidity-reduced part 93. The frame connecting part 91 is connected to a frame fork of the bicycle. The axle connecting part 92 is formed with an elongated slot 921 permitting the rear axle to extend therethrough. The rigidity-reduced part 93 includes a lip portion 911 which is movable along a front-rear direction that is transverse to the rear axle when the chain force is exerted on the rear axle, and which is mounted with the magnetic element 94. The hall sensor 95 is disposed on the frame connecting part 91 that is spaced apart from and corresponds in position to the magnetic element 94.

When a cyclist is pedaling, the chain force exerting on the rear axle makes the rigidity-reduced part 93 deform and move relative to the frame connecting part 91 in the front-rear direction. At the same time, the lip portion 911 moves relative to the hall sensor 95 together with the magnetic element 94 in the front-rear direction and a magnetic field generated by the magnetic element 94 is changed so as to give off a signal that is indicative of the magnitude of the chain force and that is received by the hall sensor 95.

However, the hall sensor 95 is disposed to be spaced apart from the magnetic element 94 without a spacer. Consequently, when the rigidity-reduced part 93 deforms, the magnetic element 94 may be in contact with the hall sensor 95, thus adversely affecting measuring accuracy of the chain force measuring device.

SUMMARY OF THE INVENTION

Therefore, the object of the present invention is to provide a chain force measuring device in which a hall element can be guarded against contact with a magnetic element so as to measure chain force precisely when a cyclist is pedaling.

Accordingly, the chain force measuring device of the present invention includes a dropout body unit and a hall sensing unit. The dropout body unit has a frame connecting portion adapted to be connected to a frame fork of a bicycle, an axle connecting portion disposed opposite to the frame connecting portion and adapted to be connected to a wheel axle of the bicycle for being shifted therewith, an accommodation space extending in a transverse direction to terminate at an overhang surface that borders the frame connecting portion, and a shiftable surface that borders the axle connecting portion, and further extending forward to terminate at a limiting wall surface, and a force transmitting member disposed on the shiftable surface, extending toward the overhang surface, and spaced apart from the limiting wall surface by a sensor activating zone. The hall sensing unit includes a sensor disposed downwardly from the overhang surface to confront the sensor activating zone, and extending in a longitudinal direction, a slidable carrier disposed in the sensor activating zone to be spaced apart from the sensor in the transverse direction, and having a pushed end that is configured to abut against and that is shiftable by a pushing force of the force transmitting member toward the limiting wall surface when a chain force is exerted on the wheel axle, and a head that is disposed to confront the limiting wall surface, a biasing member disposed on the head and configured to abut against the limiting wall surface to provide a biasing force counteracting the pushing force, and a magnetic element disposed on the slidable carrier, and spaced apart from the sensor by a predetermined distance such that a magnetic field generated thereby is changed when the magnetic element is shifted with the slidable carrier relative to the sensor so as to give off a signal indicative of the magnitude of the chain force.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
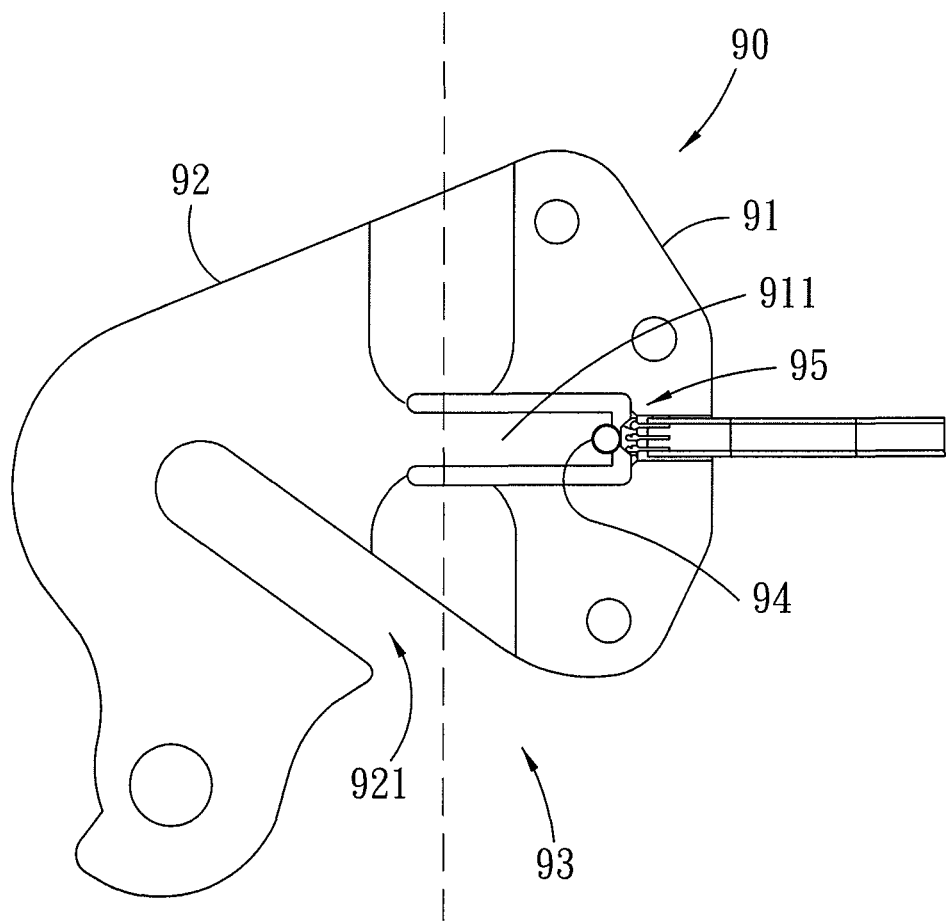
FIG. 1 is a schematic side view of a conventional chain force measuring device to be mounted on a rear axle of a bicycle.
Figure 2:
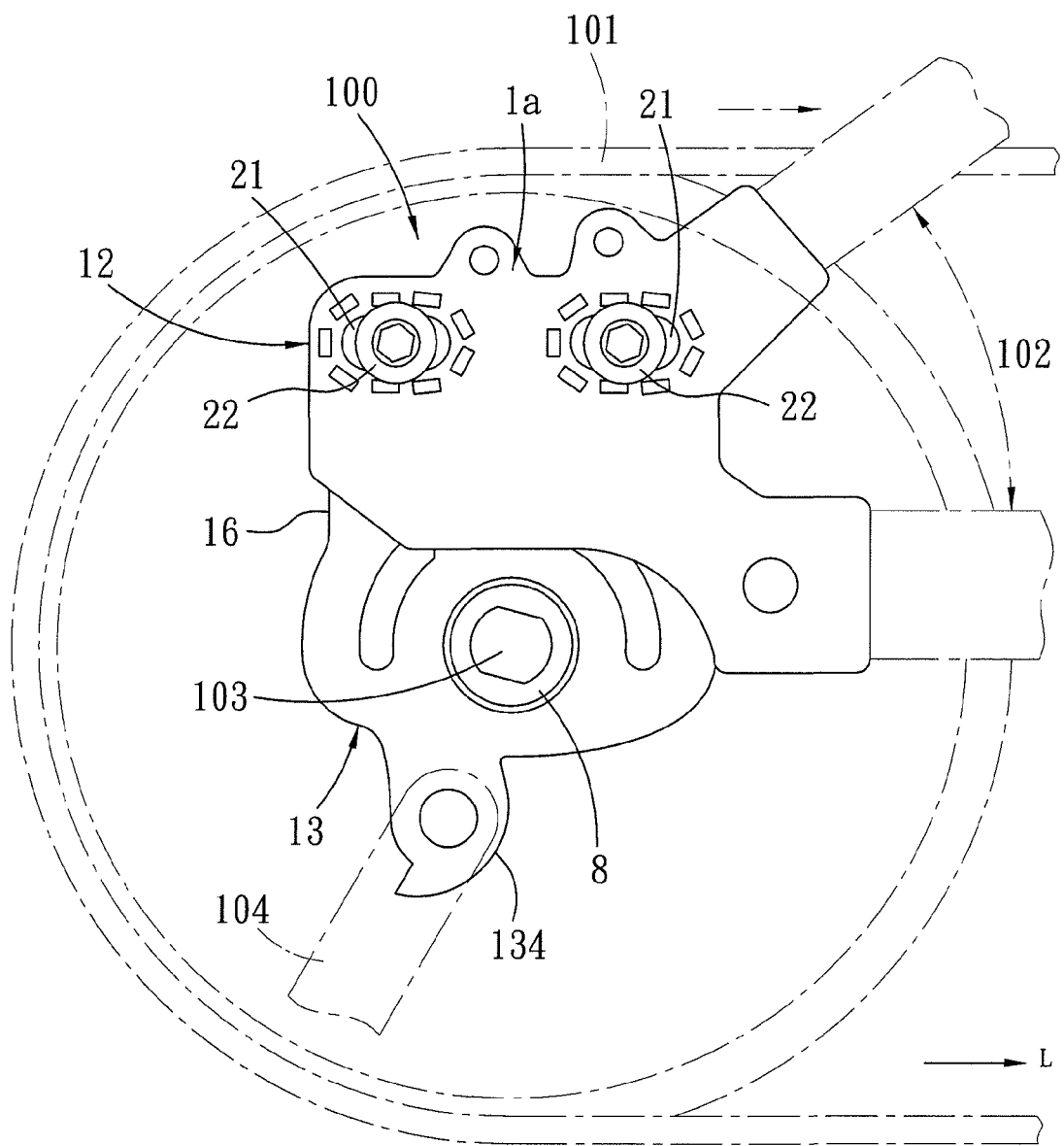
FIG. 2 is a schematic side view of a chain force measuring device of a preferred embodiment according to the present invention, illustrating the preferred embodiment mounted on a wheel axle of a bicycle.

Referring to FIG. 2, a chain force measuring device 100 of the present invention is adapted for mounting on a bicycle (not shown). The bicycle includes a frame fork 102 and a wheel axle 103 on which a chain force of a chain 101 is exerted when a cyclist is pedaling, and which is mounted relative to the frame fork 102 so as to be shiftable forward by the chain force in a longitudinal direction (L). In this embodiment, the wheel axle 103 is a rear axle of the bicycle.

Figure 3:
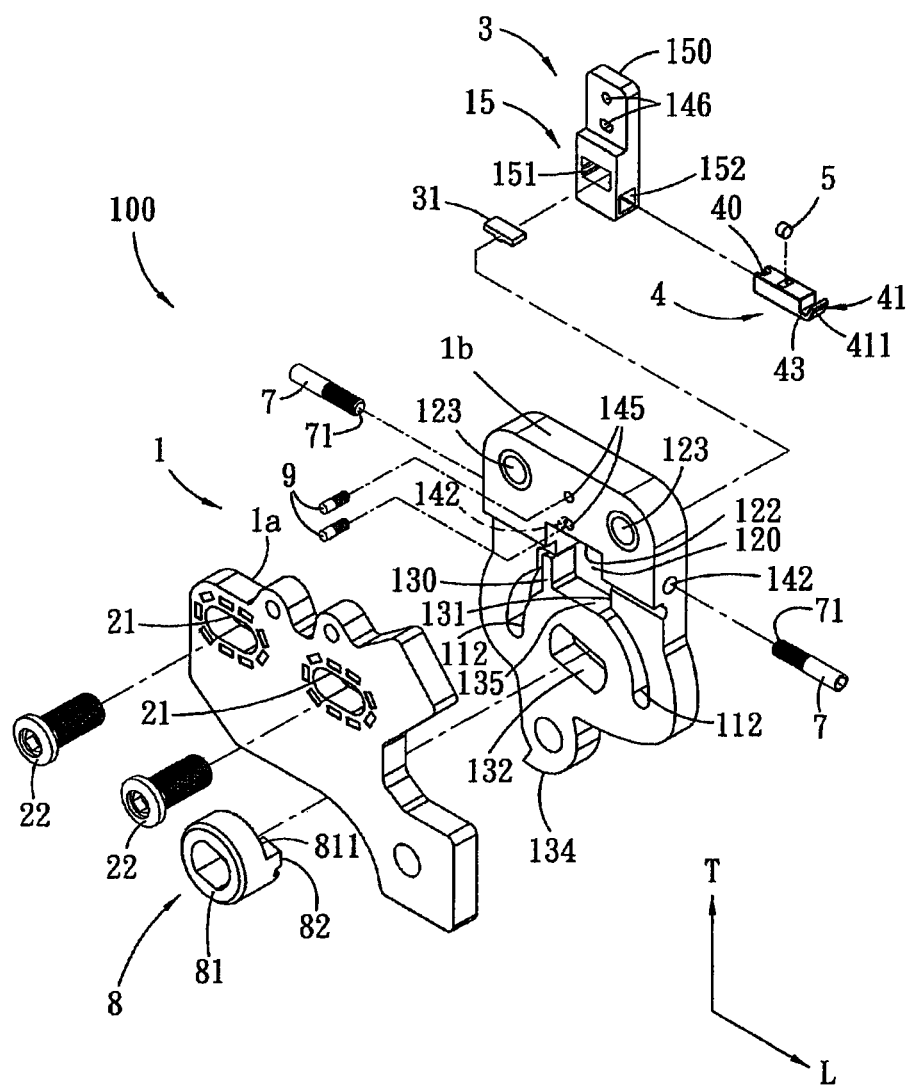
FIG. 3 is an exploded perspective view of the preferred embodiment.
Figure 4:
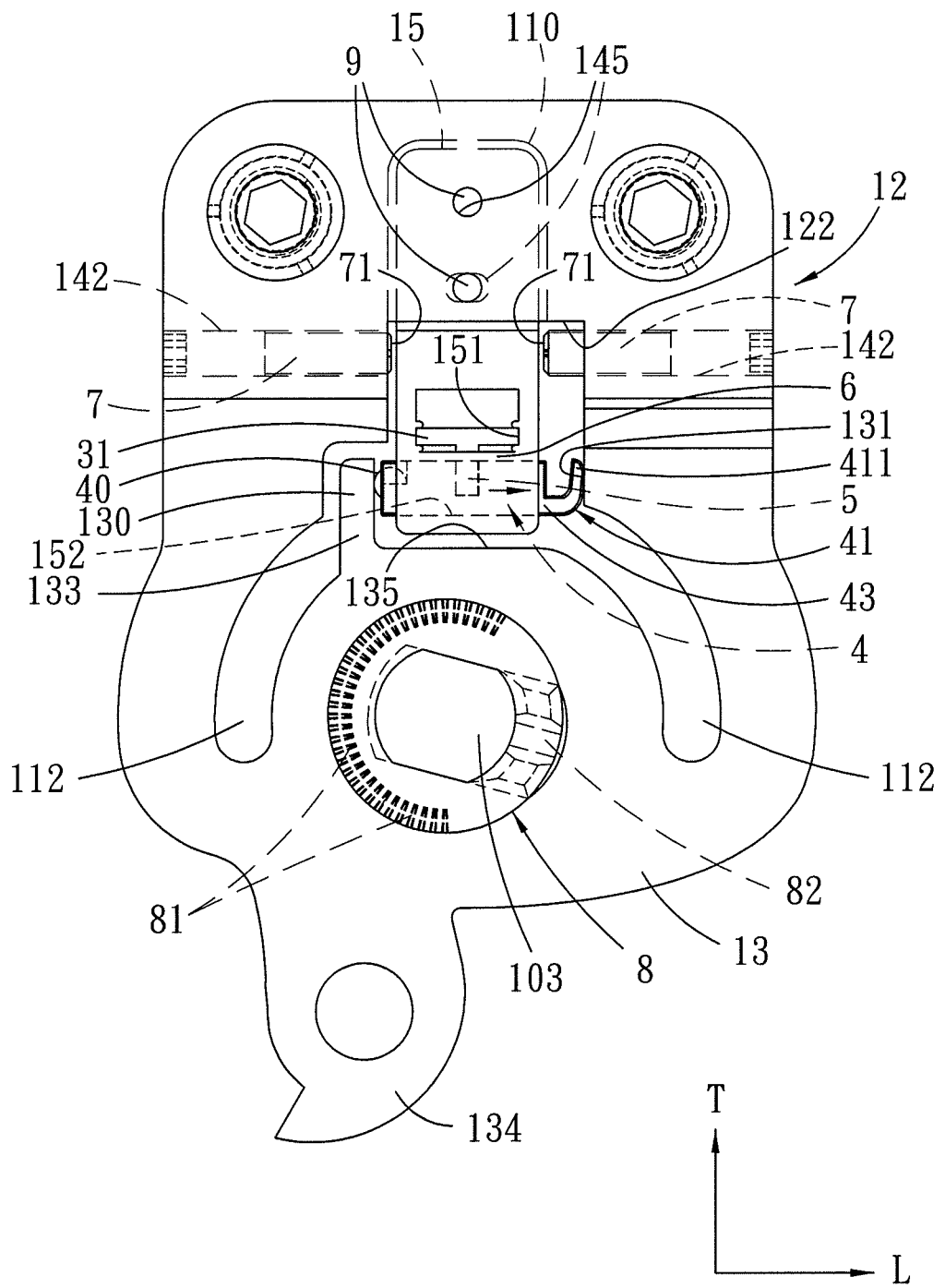
FIG. 4 is a schematic side view of the preferred embodiment.

Further referring to FIGS. 3 and 4, the chain force measuring device 100 comprises a dropout body unit 1 and a hall sensing unit 3. The dropout body unit 1 includes two coupling pieces (1a, 1b) coupled to each other for connecting the frame fork 102 and the wheel axle 103. Specifically, the dropout body unit 1 has a frame connecting portion 12 and an axle connecting portion 13.

The frame connecting portion 12 is secured to the frame fork 102 of the bicycle by a welding process or threaded bolts. In this embodiment, one coupling piece (1a) is formed with a plurality of elongated locking holes 21 and the other coupling piece (1b) is formed with a plurality of through holes 123 corresponding in position to the locking holes 21 such that a plurality of fasteners 22 are disposed to extend through the locking holes 21 and the through holes 123 to be adjustably connected to the frame forks 102 of different dimensions.

The axle connecting portion 13 is opposite to the frame connecting portion 12 in a transverse direction (T) that is transverse to the longitudinal direction (L), is formed with a non-circular axle hole 132 for permitting the wheel axle 103 to extend therethrough so as to be shifted therewith, and has a connecting lug 134 disposed at a lowermost end thereof for securing a derailleur 104 of the bicycle thereon.

In the coupling piece (1b), an accommodation space 120 is formed and extends in the transverse direction (T) to terminate at an overhang surface 122 that borders the frame connecting portion 12, and a shiftable surface 135 that borders the axle connecting portion 13. The accommodation space 120 further extends forward to terminate at a limiting wall surface 131. A force transmitting member 130 is disposed on the shiftable surface 135, extends toward the overhang surface 122, and is spaced apart from the limiting wall surface 131 by a sensor activating zone.

Further, the axle connecting portion 13 has front and rear slots 112 which extend angularly about the wheel axle 103 toward the force transmitting member 130 and through the shiftable surface 135 to communicate with the accommodation space 120 so as to reduce the rigidity of the axle connecting portion 13 in the longitudinal direction (L) and to permit the chain force to be evenly exerted to the axle connecting portion 13.

The hall sensing unit 3 includes a mounting bracket 15, a sensor 31, a slidable carrier 4, a biasing member 41, and a magnetic element 5.

The sensor 31 is disposed downwardly from the overhang surface 122 to confront the sensor activating zone, and is configured to extend in the longitudinal direction (L). The slidable carrier 4 is disposed in the sensor activating zone to be spaced apart from the sensor 31 in the transverse direction (T), and has a pushed end 40 and a head 43. The pushed end 40 is configured to abut against and to be rollably engaged with the force transmitting member 130, and is shiftable by a pushing force of the force transmitting member 130 toward the limiting wall surface 131 when a chain force is exerted on the wheel axle 103. The head 43 is disposed to confront the limiting wall surface 131.

The biasing member 41 is disposed on the head 43 and is in the form of a tongue which extends forwardly from and which is integrally formed with the head 43 to terminate at an abutment end 411. The abutment end 411 can abut against the limiting wall surface 131 to provide a biasing force counteracting the pushing force and that is spaced apart from the head 43 so as to increase the yieldability thereof. Therefore, when the biasing member 41 is abutted against the limiting wall surface 131, the abutment end 411 is yielded rearward. It should be noted that, instead of using a spring, by virtue of the configuration of the biasing member 41, elastic fatigue and rusting of the spring can be avoided.

Figure 6:
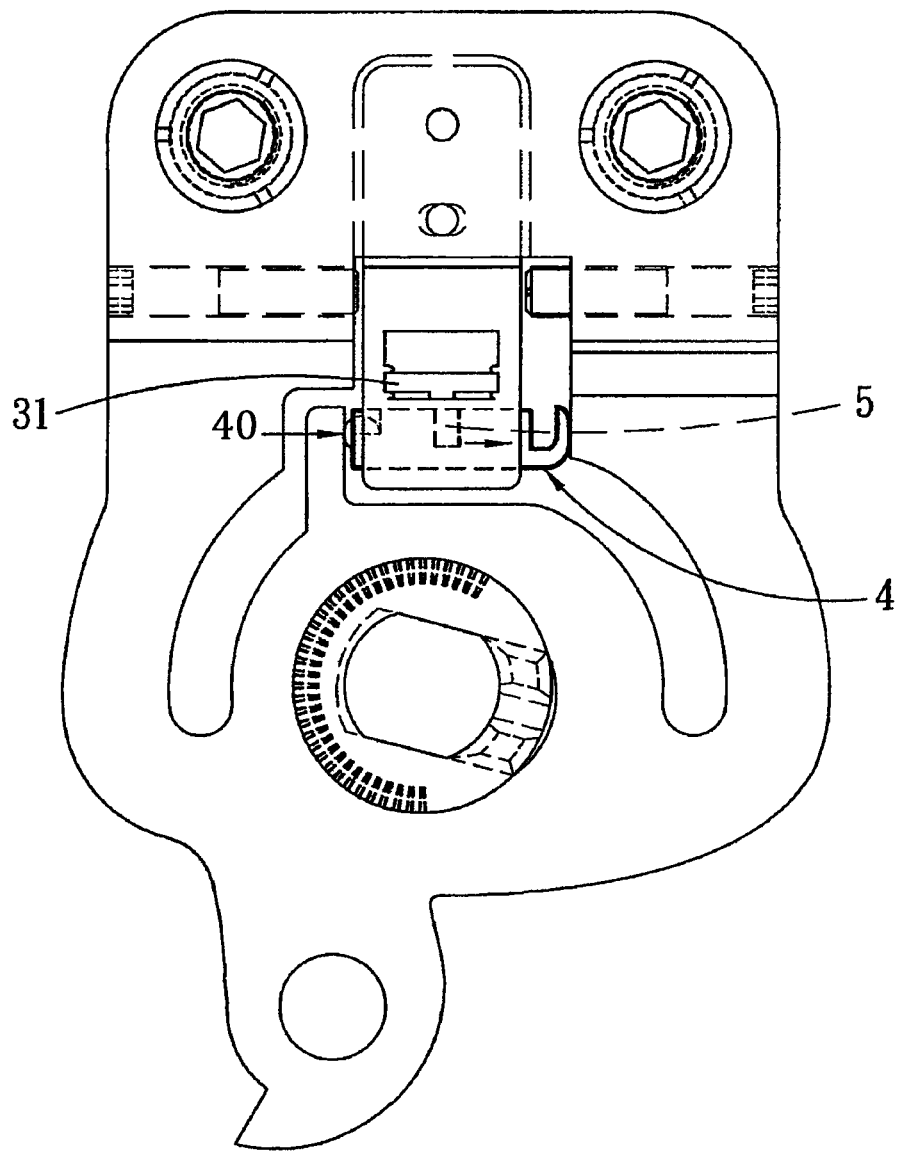
FIG. 6 is a schematic side view of the preferred embodiment, illustrating the slidable carrier shifted relative to a frame connecting portion of the preferred embodiment.

The magnetic element 5 is disposed on the slidable carrier 4, and is spaced apart from the sensor 31 by a predetermined distance such that a magnetic field generated thereby is changed when the magnetic element 5 is shifted with the slidable carrier 4 relative to the sensor 31 (see FIG. 6) so as to give off a signal indicative of the magnitude of the chain force.

A spacer 6 is disposed between the sensor 31 and the slidable carrier 4, and extends in the longitudinal direction (L) to keep the predetermined distance between the magnetic element 5 and the sensor 31 and to prevent physical contact therebetween when the slidable carrier 4 is shifted in the longitudinal direction (L) caused by the chain force of the chain 101 exerted on the axle connecting portion 13.

Figure 5:
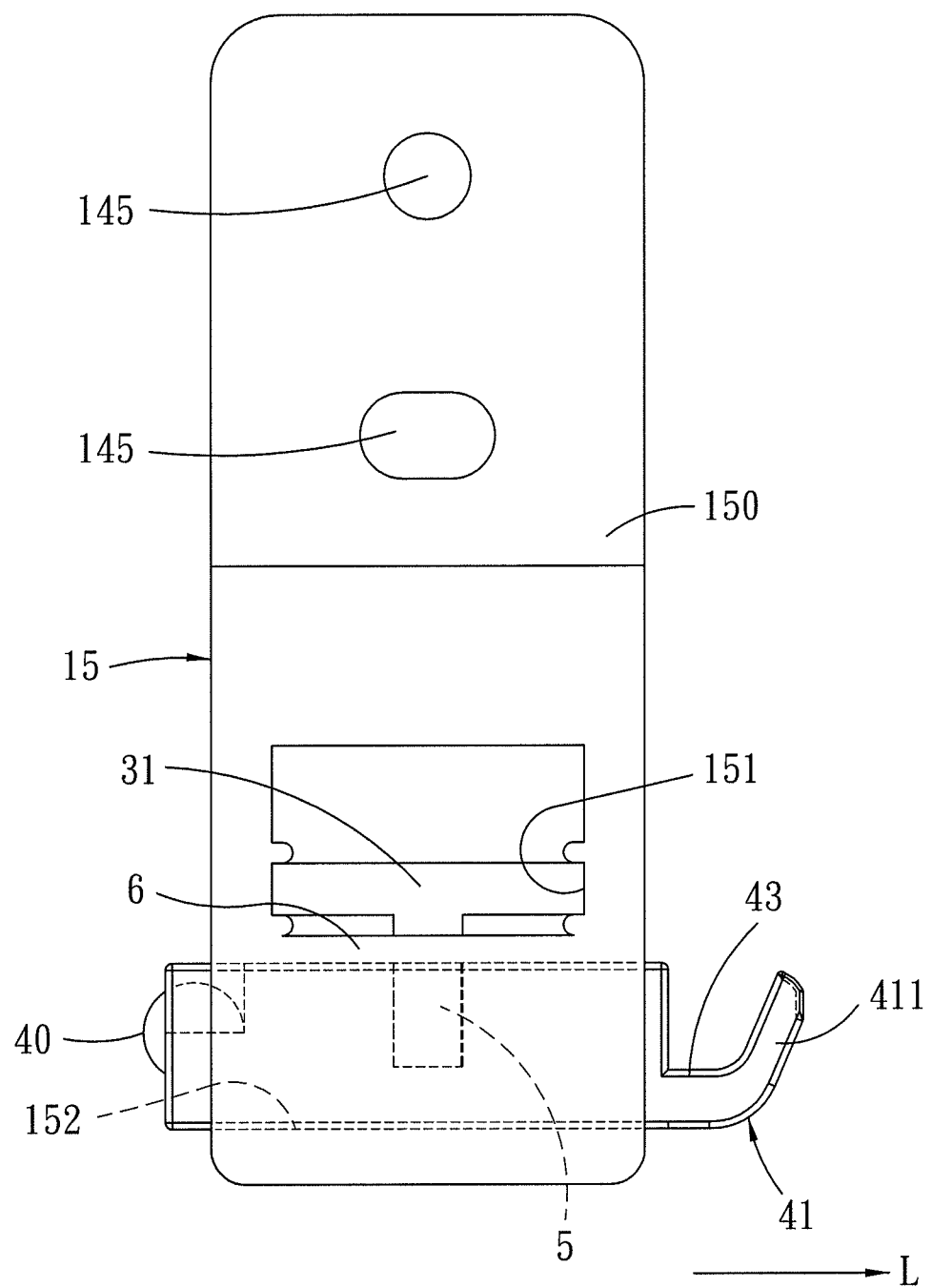
FIG. 5 is a schematic side view of a mounting bracket and a slidable carrier of the preferred embodiment.

Further referring to FIG. 5, the mounting bracket 15 has a cavity 151 and a sliding channel 152. The sliding channel 152 extends along the longitudinal direction (L) for receiving the slidable carrier 4 so as to permit the slidable carrier 4 to slide along the sensor activating zone between the force transmitting member 130 and the limiting wall surface 131. The sliding channel 152 extends upwardly to terminate at a ceiling wall that serves as the spacer 6. The cavity 151 is configured to position the sensor 31 therein, and is configured to share the ceiling wall with the sliding channel 152.

In this embodiment, the frame connecting portion 12 has a retaining recess 110 (see FIG. 4) extending to communicate with the accommodation space 120. The mounting bracket 15 is fastened to the frame connecting portion 12, and includes a lug 150 configured to fittingly mate with the retaining recess 110 to be disposed above the sensor 31 and distal from the sliding channel 152.

Further, the frame connecting portion 12 is formed with a plurality of elongated holes 145 elongated in the lengthwise direction (L) and communicating with the retaining recess 110, and the lug 150 of the mounting bracket 15 is formed with a plurality of fastening holes 146 corresponding in position to the elongated holes 145. A fastening unit includes a plurality of bolts 9 which extend through the elongated holes 145 and the fastening holes 146 so as to releasably secure the mounting bracket 15 to the frame connecting portion 12 such that the mounting bracket 15 is adjustable relative to the frame connecting portion 12 in both the longitudinal direction (L) and the transverse direction (T) so as to adjust the distance between the sensor 31 and the magnetic element 5.

In this embodiment, the fastening unit further includes two abutting members 7, and the frame connecting portion 12 is formed with two threaded holes 142 at lateral sides thereof. The abutting members 7 are disposed to be threadedly engaged with the threaded holes 142 and have abutting ends 71 which extend toward each other into the accommodation space 120 so as to abut against the mounting bracket 15 to keep the hall sensing unit 3 immovable relative to the frame connection portion 12 in the longitudinal direction (L).

Figure 7:
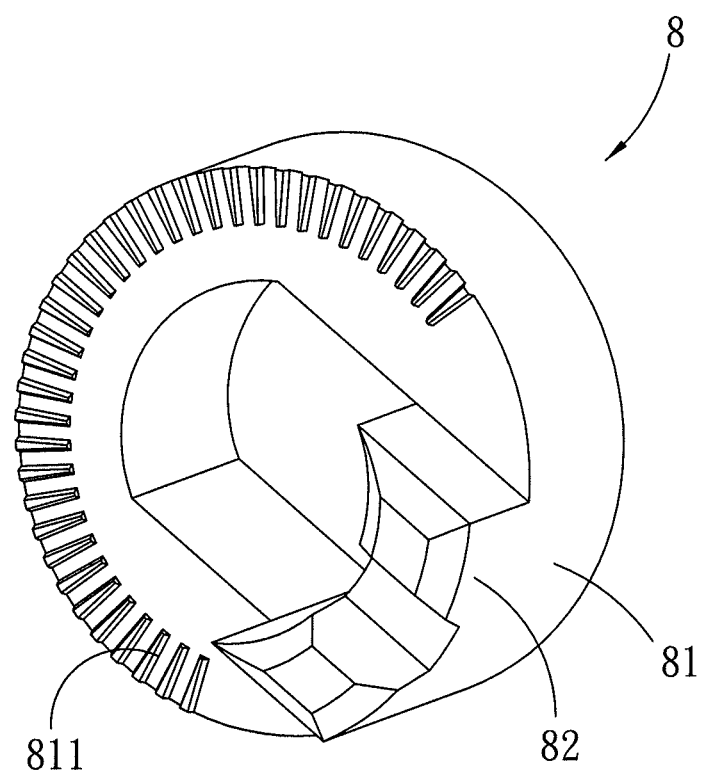
FIG. 7 is a perspective view of a bolt nut of the preferred embodiment.

Further referring to FIG. 7, a bolt nut 8 includes an annular ring 81 and a protrusion 82. The annular ring 81 permits the wheel axle 103 to extend therethrough and has an embossed surface 811 abutting against and in frictional contact with the axle connecting portion 13 of the dropout body unit 1. The protrusion 82 protrudes from the annular ring 81 and extends into the axle hole 132, such that the connecting strength between the axle connecting portion 13 and the wheel axle 103 is enhanced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A chain force measuring device adapted for mounting on a bicycle, the bicycle including a frame fork and a wheel axle on which a chain force is exerted when a cyclist is pedaling, and which is mounted relative to the frame fork so as to be shiftable forward by the chain force in a longitudinal direction, said chain force measuring device comprising:
   a dropout body unit having
       a frame connecting portion which is adapted to be connected to the frame fork,
       an axle connecting portion which is opposite to said frame connecting portion in an upright direction that is transverse to the longitudinal direction, and which is adapted to be connected to the wheel axle for being shifted therewith,
       an accommodation space which extends in the upright direction to terminate at an overhang surface that borders said frame connecting portion, and a shiftable surface that borders said axle connecting portion, and which further extends forward to terminate at a limiting wall surface, and
       a force transmitting member which is disposed on said shiftable surface, which extends toward said overhang surface, and which is spaced apart from said limiting wall surface by a sensor activating zone; and
   a hall sensing unit including
       a sensor which is disposed downwardly from said overhang surface to confront said sensor activating zone, and which is configured to extend in the longitudinal direction,
       a slidable carrier which is disposed in said sensor activating zone to be spaced apart from said sensor in the upright direction, and which has a pushed end configured to abut against and be shiftable by a pushing force of said force transmitting member toward said limiting wall surface when a chain force is exerted on the wheel axle, and a head disposed to confront said limiting wall surface,
       a biasing member disposed on said head and configured to abut against said limiting wall surface to provide a biasing force counteracting the pushing force, and
       a magnetic element disposed on said slidable carrier, and spaced apart from said sensor by a predetermined distance such that a magnetic field generated thereby is changed when said magnetic element is shifted with said slidable carrier relative to said sensor so as to give off a signal indicative of the magnitude of the chain force.

2. The chain force measuring device as claimed in claim 1, wherein said hall sensing unit includes a spacer disposed between said sensor and said slidable carrier and extending in the longitudinal direction to keep the predetermined distance between said magnetic element and said sensor and to prevent physical contact there between when said slidable carrier is shifted in the longitudinal direction caused by the chain force exerted on said axle connecting portion.

3. The chain force measuring device as claimed in claim 2, wherein said hall sensing unit includes a mounting bracket that is fastened to said frame connecting portion and that has a sliding channel which extends along the longitudinal direction, which permits said slidable carrier to slide along said sensor activating zone between said force transmitting member and said limiting wall surface, and which extends toward said sensor to terminate at a ceiling wall that serves as said spacer.

4. The chain force measuring device as claimed in claim 3, wherein said mounting bracket has a cavity which is configured to position said sensor therein, and which is configured to share said ceiling wall with said sliding channel.

5. The chain force measuring device as claimed in claim 4, wherein said frame connecting portion of said dropout body unit includes a retaining recess which extends to communicate with said accommodation space, said mounting bracket including a lug which is disposed above said sensor and which is configured to fittingly mate with said retaining recess.

6. The chain force measuring device as claimed in claim 5, further comprising a fastening unit disposed to releasably fasten said lug to said retaining recess such that said mounting bracket is adjustable relative to said frame connecting portion so as to adjust the distance between said sensor and said magnetic element.

7. The chain force measuring device as claimed in claim 6, wherein said fastening unit includes two abutting members disposed to be threadedly engaged with said frame connecting portion and having abutting ends which extend toward each other into said accommodation space so as to abut against said mounting bracket to keep said hall sensing unit immovable relative to said frame connection portion in the longitudinal direction.

8. The chain force measuring device as claimed in claim 1, wherein said axle connecting portion has front and rear slots which extend angularly about the wheel axle toward said force transmitting member and through said shiftable surface to communicate with said accommodation space so as to reduce the rigidity of said axle connecting portion in the longitudinal direction and to permit the chain force to be evenly exerted to said axle connecting portion.

9. The chain force measuring device as claimed in claim 1, wherein said pushed end of said slidable carrier is configured to be rollably engaged with said force transmitting member, said biasing member being in a form of a tongue which extends forwardly from said head to terminate at an abutment end that is spaced apart from said head so as to increase the yieldability thereof, and which is integrally formed with said head such that, upon being abutted against said limiting wall surface, said abutment end is yielded rearward.

10. The chain force measuring device as claimed in claim 1, wherein said axle connecting portion of said dropout body unit is formed with a non-circular axle hole adapted to permit the wheel axle to extend therethrough.

* * * * *